July 13, 1965
G. S. McNAE
3,194,707
METHOD OF APPLYING A BONDED SKIN OR COVERING TO
A SURFACE TO RENDER IT WATER-TIGHT
Filed Aug. 7, 1961
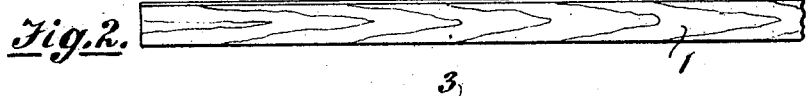
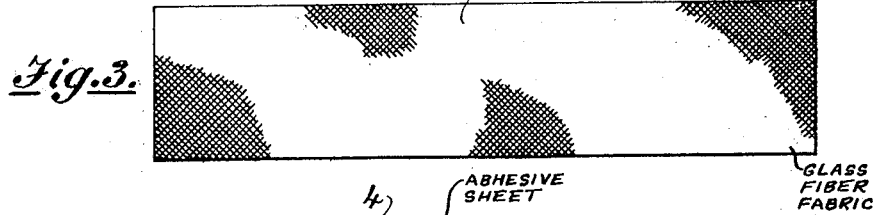
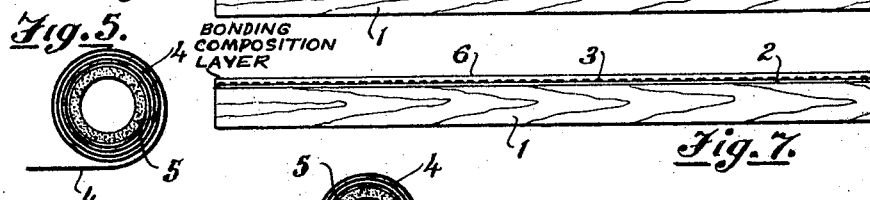
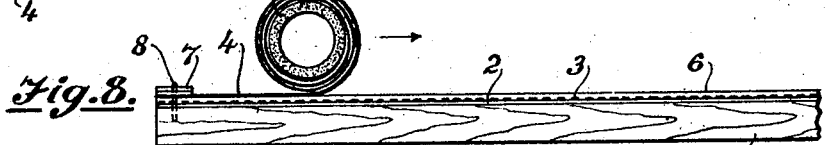
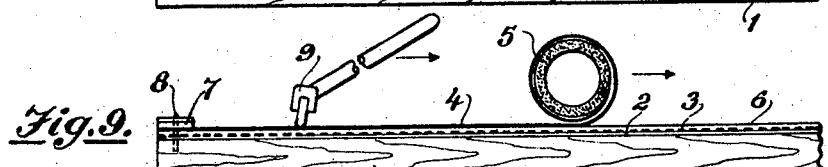
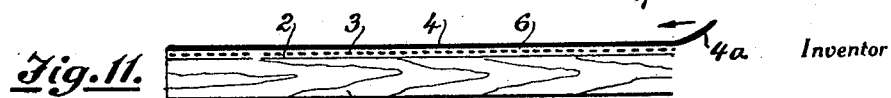
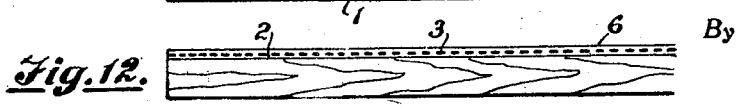
Inventor
By
Attorney

United States Patent Office

3,194,707
Patented July 13, 1965

3,194,707
METHOD OF APPLYING A BONDED SKIN OR COVERING TO A SURFACE TO RENDER IT WATER-TIGHT
Gordon Spencer McNae, Portland, near Whangarei, Auckland, New Zealand
Filed Aug. 7, 1961, Ser. No. 129,617
Claims priority, application New Zealand, Aug. 19, 1960, Patent 127,180
5 Claims. (Cl. 156—247)

The invention relates to a method of applying a bonded skin or covering to a surface to render the latter water-tight, the method involving the use of glass fiber fabric.

The bonding of glass fibed fabric to surfaces to render them watertight is an art that has now become well-known, the procedure having been found particularly useful in its application to the outer surface of the hulls, decks, cabin tops and other parts of boats when such parts are made of wood, although the procedure can have other applications where leakage, or absorption of water, would normally occur and where it is desired to make a surface impervious to the penetration of water.

Materials for use in applying the skin or covering are available for purchase on the market.

In the application of glass fiber fabric to a wooden surface for the purpose explained, the procedure normally adopted is, generally speaking, as follows:

The surface is thoroughly cleaned to remove old paint and dirt and to expose the raw wood, this operation being usually carried out by sanding. The wood is then allowed to dry out completely, if it is not already in that condition.

A roll of glass fiber fabric is taken and cut to the shape of the surface to be covered, or of part of the surface where the skin can only be applied conveniently in sections, marginal allowance being provided for if necessary or desirable.

To the cleaned and dried wood there is applied at least one coat of liquid resinous priming which is then allowed to harden or cure or partly cure.

The cut piece of glass fiber fabric is now laid on the primed surface, whereupon a liquid resinous bonding agent is brushed or rolled on the exposed face of the fabric, the amount of liquid used being sufficient to ensure that the fabric becomes thoroughly wetted, and the liquid being worked over the face of the fabric so as to ensure that the latter will come into close and continuous contact with the primed wooden surface.

The work is now allowed to stand for two or three days to allow the bonding agent to harden, by which time the fabric will have become firmly bonded to the wooden surface, and the hardened bonding agent will have more or less filled the interstices between the glass fibres of the fabric.

A coat of a liquid resinous composition is next applied, as a flood coat, to the bonded fabric so as to insure the production of an impenetrable seal on the outer surface of the fabric, this flood coat then being left to dry.

As the next step, and with the object ultimately of ensuring that the glass fiber fabric will become completely embedded and that a smooth finish will be obtained, this being particularly desirable where the method is applied to the hulls of boats, the dried flood coat is finely sanded by hand with "wet and dry" sandpaper, whereupon a second flood coat of liquid resinous composition, which may be of the same kind as that used for the first flood coat, is applied.

The second flood coat is now allowed to dry and, again to remove irregularities and surface blemishes that have developed as a result of application of this coat, is finely sanded by hand.

Finally, a finishing coat of liquid resinous composition is painted on to the sanded second flood coat.

The coating and sanding operations described are similar to those used in lacquering the body-work of a motor vehicle.

The known method outlined in the foregoing is time wasting and tedious as it is not only necessary to cease work while each of the priming, flooding and finishing coats is reaching a dried state, but it is also necessary to perform two sanding operations in order to obtain a good standard of finish, the end result depending largely on the amount of sanding work the operator cares to put into the job.

In the practice of the method, it is strongly recommended that a face mask or respirator be worn at least during the sanding operations on the first flood coat, to prevent the inhalation of particles of glass abraded from exposed portions of the glass fiber fabric, as well as particles of dry resin.

The object of the present invention is to provide for the application of a bonded skin or covering of glass fiber fabric to a surface to render it water-tight, by a method which is noticeably more simple, safe and speedy than methods heretofore practiced, but which will none-the-less give equally good, if not better, results.

Another object of the invention is to provide, for the purpose referred to, a method which, while being relatively simple and expeditious to perform, will ensure not only the production of a hard, water resistant skin or covering, but will also give a surface finish having a very high gloss.

A further object of the invention is to provide a method which can be carried out in such a way as to render the wearing of a face mask or respirator unnecessary.

The method of the invention comprises the steps of cleaning and drying the surface of the article to which the skin or covering is to be applied, should such surface not already be in that condition; applying to the said surface at least one coat of liquid resinous priming composition and allowing the coat to harden or cure or partly cure; cutting a piece of glass fiber fabric to the shape of the said surface or of a part of the surface; cutting a piece of pliable but impervious sheet material to the shape of the cut piece of glass fiber fabric; applying the piece of glass fiber fabric to the said surface; applying a liquid resinous bonding composition to the exposed face of the piece of glass fiber fabric in sufficient quantity to ensure thorough wetting of the fabric; applying the piece of pliable sheet material to the exposed surface of the liquid bonding composition; applying pressure to the exposed face of the piece of pliable sheet material so as to bring it into close contact with the bonding composition; retaining the piece of pliable sheet material in place until the bonding composition has become set; and then peeling off the piece of pliable sheet material I will now describe, by way of example, and with reference to the accompanying diagrammatic drawings, how the method of the invention may be carried into practical effect, it being assumed for convenience that the method is used for application of an outside skin or covering to the wooden hull of a boat. In the drawings:

FIGURE 1 is a side edge view of a portion of the hull;

FIGURE 2 is a view similar to that of FIGURE 1 but showing application of one of the steps of the method;

FIGURE 3 is a plan view of a piece of glass fiber fabric;

FIGURE 4 is a plan view of a piece of pliable but impervious sheet material;

FIGURE 5 is an end view showing the sheet material of FIGURE 4 when wound on a mandrel;

FIGURES 6 to 11 are side edge views showing the application of further progressive steps in the method, and FIGURE 12 is a side edge view showing the finished result.

The drawings are not to scale, some of the dimensions being much exaggerated for convenience of illustration.

The outer surface 1a of the hull 1 is thoroughly cleaned, as by the use of a scraper or an electrically driven hand sander, so as to remove old paint and expose the raw wood. The hull is now allowed to dry out, if it is not already in that condition. Any cracks, seams, screw-holes or dents are filled with a suitable stopping compound, preferably one have a resinous base, and the stopping compound is smoothed off by additional sanding if necessary.

As shown in FIGURE 2, an undercoat 2 of liquid resinous priming composition is now applied to the cleaned surface of the hull 1, the undercoat then being allowed to harden for a period of at least 48 hours. It is desirable that the undercoating operation should be performed in a room or other enclosure maintained at a temperature of about 80° F. This will ensure that the priming composition will flow freely and have a sufficient degree of penetration into the timber of the hull to become firmly bonded to the woodwork.

After lapse of the period required for a drying of the undercoat, the boat is brought up to a temperature of at least 75° F. This can be done, for example, by standing the boat upside down on trestles (not shown), and placing heaters underneath it.

While maintaining this temperature, a roll of glass fiber fabric is now taken and from it there is cut a piece 3 shaped to cover the desired part of the surface of the hull 1. In this connection it may be explained that it will usually be found most convenient to apply the skin or covering to the hull in sections, the piece of glass fiber fabric 3 then being, if necessary or desirable, cut with end or marginal allowances to provide for turns and overlaps.

The cut piece of glass fiber fabric 3 is next covered with pliable but impervious abhesive sheet material, and, while using the piece of fabric as a pattern, the sheet material is cut to the pattern of the actual area over which a final finish is desired, the cut piece 4 of abhesive sheet material then being wound on a mandrel 5 (FIGURE 5), starting from the end which will be the last to be laid in a manner to be explained. The mandrel may conveniently consist of a hollow cardboard tube.

As shown in FIGURE 6, the cut piece of glass fiber fabric 3 is now laid on the corresponding part of the undercoated surface of the hull 1 and to the exposed face of the laid piece there is applied a coating 6 of liquid resinous bonding composition (see FIGURE 7) the composition being worked over this face and used in sufficient quantity to ensure that the fabric 3 will become thoroughly wetted. More of the bonding composition is then applied to the wetted fabric to ensure that the latter becomes fully immersed in the composition.

Thereupon, the free end of the roll of pliable sheet material 4 is tacked in position over the corresponding end of the laid piece of glass fiber fabric. As shown in FIGURE 8, tacking can conveniently be carried out by applying strips 7 of veneer to the end portion of the sheet material and then, by means of a stapling gun, driving staples 8 through the veneer strips 7, sheet material 4 and fabric 3, and partway into the underlying woodwork of the hull 1.

In the next step, as shown in FIGURE 9, a squeegee 9 of wood or hard rubber is applied to the exposed face of the piece of sheet material 4 adjacent the end thereof that has been tacked over the corresponding end of the piece of glass fiber fabric 3, and is moved, under pressure, towards the opposite end of the fabric, the sheet material 4 being at the same time, progressively unwound from the mandrel 5. This squeegee operation causes the sheet material 4 to be brought into close contact with the upper surface of the applied liquid bonding composition 6, and also ensures that the composition will have good contact with the fibres of the glass fiber fabric 3 and with the undercoated surface of the hull 1. Pressure from the squeegee 9 also causes excess bonding composition on the glass fiber fabric 3 to move in a mass towards the free end of the fabric, surplus bonding composition then being removed, or allowed to drip down into a tray (not shown) placed beneath the boat. Where the piece of glass fiber fabric 3, and the piece of sheet material 4, that is to cover it, are relatively long it may be desirable to apply the bonding composition 6 to the fabric 3 and press the sheet material 4 into contact with the composition in stages, this being done by treating a first section of the fabric 3 with bonding composition 6 and pressing the corresponding portion of the sheet material 4 into contact with the composition 6 by means of the squeegee 9, the action of the squeegee at the same time serving to move surplus bonding composition on to the part of the fabric 3 that has not so far been treated. When this first stage has been completed, the same operations are performed for the second stage, and so on until the whole of the piece of glass fiber fabric 3 has received the bonding composition, and the whole of the piece of sheet material 4 has been brought into contact with the composition.

It is necessary to make sure that no air bubbles are left between the glass fiber fabric 3 and the hull 1, or between the bonding composition 6 and the overlying sheet material 4. For this reason it is desirable, after the piece of pliable sheet material 4 has been fully laid, to give it a final run over with the squeegee 9 or with a dry cloth, using strokes moving towards a free edge of the sheet 4.

As shown in FIGURE 10, when the whole of the piece of sheet material 4 has been laid over the bonding composition 6, the free end of the sheet material is held down by the application of further strips 10 of veneer held in position by staples 11.

After a part of the surface of the hull 1 has been covered in the manner described, an adjacent part of that surface is covered by repeating the same series of operations until the entire hull has been covered.

When the steps described have been completed, the work is left to stand until the bonding composition 6 has become set and cured, it being desirable, during this time, to maintain the work at the same mean temperature of 75° F. as hereinbefore. After such curing and as a final step, the overlying piece of pliable sheet material 4, or each such piece, is untacked and is then peeled away as depicted in FIGURE 11 wherein the end 4a of the abhesive sheet 4 is being peeled away from the hardened composition layer 6.

As shown in FIGURE 12, there is thus left on the hull 1 an impervious skin or covering bonded firmly to the woodwork and rendered tough and resistant to fracture or cracking by the reinforcing effect of the glass fiber 3 embedded in it.

An important consideration in the successful carrying out of the method of the invention is that the pliable sheet material 4 used for laying over the liquid bonding composition 6, must be of such a nature in comparison with the bonding composition used, that while it is capable of being brought into close contact with the composition, it will not become bonded to the composition when the latter has become cured, but will be free to be easily peeled off as already mentioned, without taking any part of the cured bonding composition 6 with it. In other words, the sheet material 4 used for the purpose will be such as to have what is technically known as abhesive characteristics, that is to say, characteristics rendering it incapable of being glued.

A notable advantage of the method of the invention in comparison with other methods, is that the article to be rendered watertight can, after application of the priming coat 2, be provided with a completely finished, tough and impervious skin or covering in what, practically speaking, amounts to one operation only. The tedious business of applying several flood coats to the glass fiber fabric 3 after the latter has been placed in position, and where a good finish is desired, waiting until each of these coats has hardened, sanding it down, and then applying a finishing coat, is completely eliminated. As no sanding is required to get a final finish, the use of a face mask or respirator is unnecessary. The method also leads to economy in the consumption of raw material. Other advantages resulting from exercise of the invention will be mentioned later.

I do not confine myself to the use of any particular kind of resinous priming composition 2 so long as it is suitable for the purpose, the same remarks applying to the resinous bonding composition 6 used.

Nor do I limit myself to any particular kind of pliable sheet material 4 that is applied over the bonding composition 6 and is later peeled off, so long as it affords continuous surface contact with composition and has the other characteristic to which reference has been made.

As regards the undercoating composition 2 and the bonding composition 6, a variety of such compositions for use with glass fiber fabric are already available on the market. I have found, however, that a composition having the following formula gives excellent results both as an undercoat and as a bonding agent:

| | Parts by weight |
|---|---|
| Epoxy resin, type EPON 828 (said resin is shown by composition in McAdam U.S. Patent 2,858,291) | 100 |
| Reactive diluent, type allyl glycidal ether (A. G.E.) | 10 |
| Hardner, type diethylene triamine (D.T.A.) | 8 |
| Thinners, type acetone | 15 |

Among the pliable sheet materials which are usable are cellulose acetate, cellophane, polythene, acrylic, and polyvinyl chloride (P.V.C.) sheeting. With a bonding composition 6 having the formula set out above, I have found that excellent results can be obtained where P.V.C. sheeting is used, the sheeting being about 20 thousandths of an inch in thickness. Such P.V.C. sheeting, while remaining in close contact with the wet bonding composition 6 of the formula stated, after the sheeting has been applied in the manner described, and staying in that condition when the composition has become set or cured, has the additional property of not becoming positively bonded to the composition 6. Hence, the sheeting can not only eventually be peeled from the hardened composition with ease, but can also be used over and over again.

The surface of the sheeting 4 which is to be applied to the composition, may be embossed with a pattern, dimples or small squares separated by ridges or grooves for example, so that after the sheeting has been applied to the composition 6 and eventually peeled off, an imprint of the pattern will remain on the work. This would be particularly suitable for instance in cases where the method of the invention is applied to the decks of boats or to other surfaces on which people walk or stand.

Preference is to be given to pliable sheet material 4 that is transparent, for the reason that, with such material, the behaviour of the bonding composition 6 can be observed through the sheet while the squeegee operations are being performed, and the eradication of all air bubbles can, in that way, be assured.

I have mentioned some of the advantages of the method of the invention. Others are that the method is much less messy and time consuming than those heretofore used. Where, as will usually be the case, the pliable sheet material 4 that is temporarily applied to the bonding composition 6, has a polished and shiny surface texture for contact with the bonding composition, the finished skin or covering will have an inherently high gloss finish without further treatment and in fact a better gloss than can be obtained by the hand methods hitherto employed. When using a bonding composition 6 of the formula specified in the foregoing, the finished skin or covering will be substantially transparent and thus reflect the color of the surface to which it is applied. If a different color effect is desired, this can be obtained by pigmenting the composition before it is applied.

What I claim and desire to secure by Letters Patents is:

1. A method of applying a smooth bonded skin to the surface of an article to render it water-tight, said method comprising the steps of applying to said surface at least one coat of an initially liquid resinous priming composition and allowing the coat to harden; cutting a piece of glass fiber fabric to a size sufficient to cover at least a part of said surface; cutting a piece of smooth pliable and impervious abhesive sheet material to the size of the thusly cut piece of glass fiber fabric; laying the piece of glass fiber fabric on the hardened coat of resinous priming composition; applying a liquid resinous bonding composition to the exposed face of the thusly laid piece of glass fiber fabric in sufficient quantity to insure thorough wetting of said fabric; progressively applying the piece of abhesive sheet material onto the exposed surface of said bonding composition while the latter is still liquid and while applying pressure to the exposed face of the abhesive sheet material as the latter is being applied to bring the sheet material into close contact with the liquid bonding composition and thereby squeeze the bonding composition against the glass fiber and against the hardened coat while causing excess bonding composition to move in a mass towards the free end of the fabric, whereby a substantially uniform layer of bonding composition will be formed between the abhesive sheet material and the glass fiber fabric, which bonding composition will adhere to the hardened coat of priming composition; retaining the piece of abhesive sheet material in contact with the bonding composition until the latter has hardened; and then peeling off the piece of abhesive sheet material from the hardened bonding composition which now has a smooth and glossy outer surface.

2. A method as claimed in claim 1, comprising cleaning and drying the surface of the article prior to the application of the coat of priming composition.

3. A method as claimed in claim 1, wherein the piece of abhesive sheet material is progressively applied onto the exposed surface of the bonding composition by first temporarily fastening one end of the sheet material to the coating of bonding composition while the latter is still liquid and thereafter progressively applying the remainder of the abhesive sheet material into contact with the liquid coating and then temporarily fastening the opposite end of the sheet material in position.

4. A method as claimed in claim 3, wherein the abhesive sheet material is progressively applied onto the exposed surface of the bonding composition by the application of a squeegee action to the free portion of the piece of abhesive sheet material.

5. A method as claimed in claim 4, wherein the liquid priming composition and the liquid bonding composition contain epoxy resin, the adhesive sheet material being polyvinyl chloride.

References Cited by the Examiner
UNITED STATES PATENTS

| | | | |
|---|---|---|---|
| 2,459,164 | 1/49 | Holst et al. | 156—247 |
| 2,571,717 | 10/51 | Howald et al. | 156—180 |
| 2,858,291 | 10/58 | McAdam. | |
| 3,092,247 | 6/63 | Woodruff | 156—247 |

FOREIGN PATENTS

| | | |
|---|---|---|
| 1,069,702 | 2/54 | France. |
| 796,297 | 6/58 | Great Britain. |

OTHER REFERENCES

"Polyester and Fiberglass," by Maurice Lannon, Second edition, 1954, pp. 25 to 35. [Copyright 1954 by Maurice Lannon and Gem -O' Lite Plastics Co., 5350 Riverton Avenue, North Hollywood, California.]

EARL M. BERGERT, *Primary Examiner.*